May 10, 1960     P. C. SHERBURNE     2,936,142
SPRING HANGER
Filed July 21, 1958
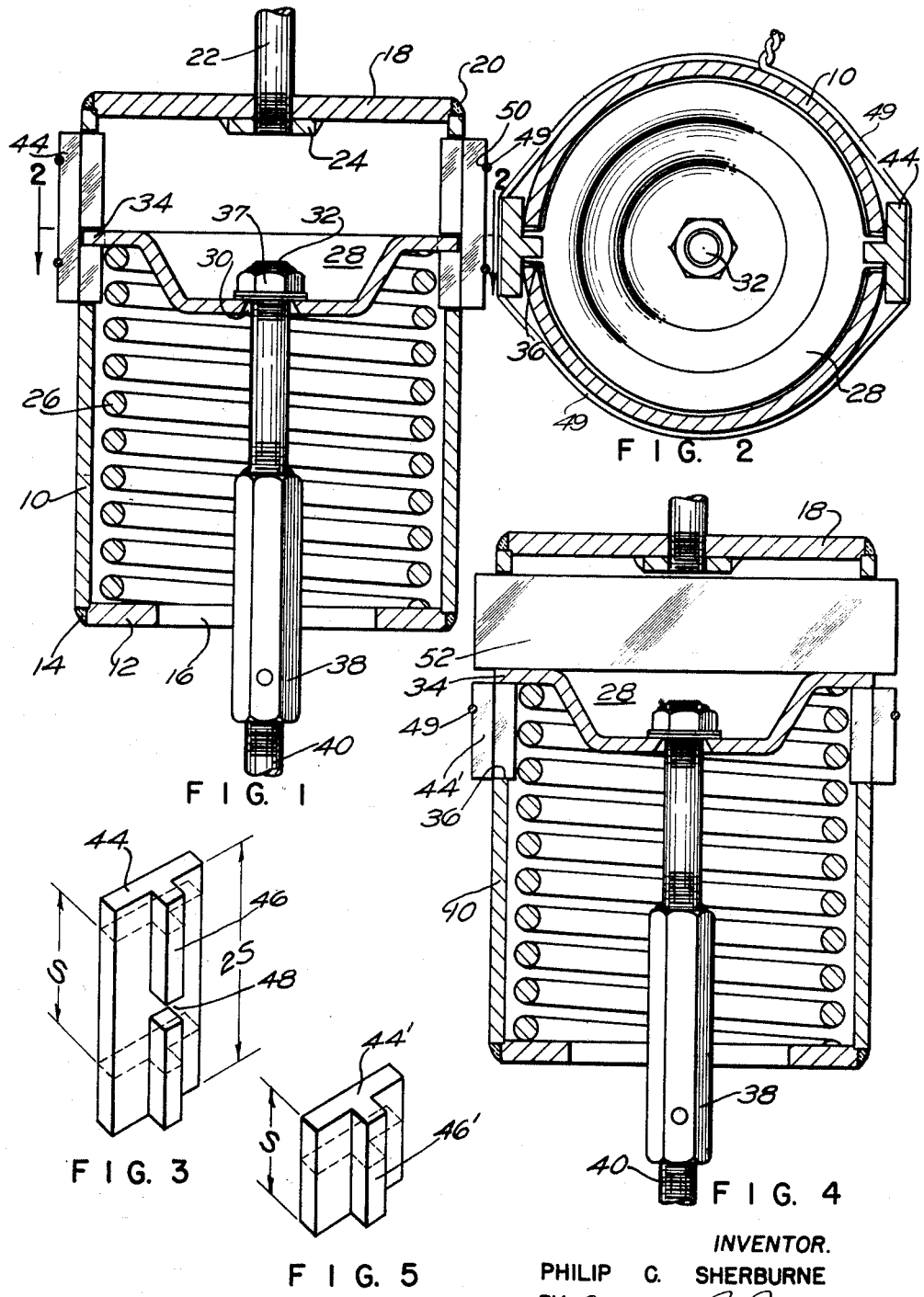
INVENTOR.
PHILIP C. SHERBURNE
BY David D. McKenney
ATTORNEY United States Patent Office 2,936,142
Patented May 10, 1960

2,936,142

SPRING HANGER

Philip C. Sherburne, Rumford, R.I., assignor to Grinnell Corporation, Providence, R.I., a corporation of Delaware Application July 21, 1958, Serial No. 749,821

4 Claims. (Cl. 248—54)

This invention relates to variable support spring hangers of the kind used to support loads subject to vertical movement. More particularly it has to do with such a hanger which is provided with novel temporary presetting and testing blocks to facilitate the installation of the hanger and hydrostatic testing of the piping supported by the hanger.

Probably the greatest use of variable support spring hangers is in the support of pipe lines which carry steam and hot water. The temperature of such lines varies between room temperature and steam temperature and causes movement of certain of the pipes in the system. Most such systems include vertical risers at one place or another from which horizontal pipe lines extend. It is the expansion or contraction of the risers which causes the vertical displacement of them and of the horizontal pipes, the magnitude of this movement being in proportion to the length of the risers. If this displacement is large, say from one to four inches, the pipes are usually supported by what is known in the trade as constant support hangers, but when the displacement is not over an inch the cost of a constant support hanger is not usually justified and the superior supporting characteristics of the constant support hanger is not usually required and the variable support hanger is used.

In most variable support hangers a compression spring is used and it is frequently preset by compressing it until it exerts a force corresponding to the load which the hanger is intended to support and then holding it in this position. For example, if the load is one thousand pounds and the spring has a constant of two hundred pounds per inch the spring would be compressed until the product of its deflection and the spring constant equaled the load of one thousand pounds. This would be a deflection of five inches. The holding is temporary because after the hanger has been connected to its load in its installed position the holding mechanism is removed and the weight of the load acting on the spring maintains the deflection. If the presetting mechanism were not removed it would prevent any upward motion of the load from the position of the load at which the hanger was installed. This would defeat the purpose of the hanger which is to permit load movement. The object of the presetting is to make installation of the hanger easy. Without presetting it would be necessary for the installer to operate the turnbuckle usually connected between the hanger and the load until the spring was properly deflected. This could be a deflection of a number of inches which would require a considerable amount of turning of the turnbuckle.

A representative variable support spring hanger is described in U. S. Patent Re. 22,980, issued March 9, 1948. The hanger shown in this patent is of the type often called a precompressed variable support hanger. "Precompressed" means that the spring is permanently deflected an initial amount so that in operation subsequent deflection due to load movement produces a change in force which is not an unduly large percentage of the load itself. This permanent precompression should not be confused with the temporary presetting previously described.

In addition to the necessity for presetting to make installation of variable support spring hangers easy, it also makes such installation more accurate. Thus, the installer is not only relieved from the job of turning the turnbuckle many times but in addition he does not need to know how many times to turn it. When the load is known at the factory and the hanger preset for that load the installer need only turn the turnbuckle enough to transfer the force of the spring from the presetting mechanism to the load. At this point, which is readily determined by the installer because the presetting mechanism becomes loose and free in its position and may be removed easily, the spring is exerting on the load a force equal to the load weight. Without such presetting the installer must determine from the position of the pointer opposite the hanger scale plate when he has turned the turnbuckle enough. Experience has shown that such use of the scale plate and pointer too frequently results in errors and improper installations.

After installation has been made another problem may arise. A liquid, usually water, is often introduced into the piping system at some pressure for testing the presence of any leaks. Since the liquid is much heavier than the steam which the piping is intended to carry in service, the entire piping system would be heavier than usual during this test and would undergo downward movement greater than desirable if merely supported by the spring hangers. The result of such movement would be to put a greater strain on the piping joints and connections than is desirable.

The present invention overcomes the above installation and testing problems by the provision of removable block elements which can temporarily hold the spring at its installed position.

In one embodiment of the invention the blocks assume the form of a T-shaped cross-sectional element. The leg of the T is adapted to be inserted in the casing slot and has a notch at a selected location along its length. This notch receives a tongue on the spring plate which also extends into the casing slot, and the notch thus prevents movement of the spring either upwardly due to the spring force which is unbalanced prior to installation or downwardly due to the increased load after installation and during a hydrostatic test. The top of the T overlies the outside of the casing on either side of the slot.

It is a feature of one form of these blocks that they be initially formed approximately twice as long as the slots with the notch at about the center of the leg. In this way the ends of the block may be cut off so that the notch comes at the desired point with respect to the slot but the length of the block is equal to the length of the slot and fits nicely therein.

It is a feature of another form of these blocks that they be initially formed of a length equal to that of the slots in which case the notch is cut for each hanger in the proper place.

It is an object of the present invention to provide a variable support spring hanger with an improved mechanism which holds the hanger in a preset condition.

Another object of the invention is to provide a variable support spring hanger with an improved mechanism which holds the hanger in a position for a hydrostatic test of the supported load.

Another object is to provide a variable support spring hanger with a pair of slots in the casing and blocks which fit into the slots to engage and hold the spring plate immovable with respect to the casing.

Another object is to provide a variable support spring hanger with a pair of diametrically opposed slots in the casing which receive a block extending across the top of the spring plate and additional blocks which hold the spring plate a certain distance from the ends of the slot.

Another object is to provide a variable support spring hanger with a pair of diametrically opposed slots in the casing which receive a pair of blocks engaging and holding an extension of the spring plate against movement relative to the casing toward either end of the casing.

Another object is to provide a variable support spring hanger of the type described in which the blocks are T-shaped in cross-section and are provided with notches for receiving the spring plate extension.

Another object is to provide a variable support spring hanger with mechanism for presetting and holding the hanger for test which is simple in construction, inexpensive to manufacture and convenient to use.

Other objects will appear hereinafter.

The best mode in which I have contemplated applying the principles of my invention is described in the following text and shown in the accompanying drawings which are to be deemed merely illustrative, for it is intended that the patent shall cover by suitable expression in the appended claims whatever of patentable novelty which exists in the invention disclosed.

In the drawings:

Fig. 1 is a cross-sectional view of a precompressed spring hanger in accordance with one embodiment of the invention;

Fig. 2 is a view taken on line 2—2 of Fig. 1;

Fig. 3 is a perspective of the block illustrated in Fig. 1;

Fig. 4 is a cross-sectional view of a precompressed spring hanger in accordance with a second embodiment of the invention; and Fig. 5 is a perspective of the block shown in Fig. 4.

Fig. 1 shows a cylindrical casing 10 provided at its bottom end with a circular plate 12 secured to the casing as by welding at 14, the plate 12 having a central aperture 16. The top of the casing is provided with a plate 18 also secured to the casing as by welding at 20. A suspension rod 22 is threaded into plate 18 which may be provided with a reinforcement 24 for greater thread engagement. A helical compression spring 26 having a free length substantially greater than the inside height of the casing 10 is positioned with its bottom resting on the top of plate 12 and its top convolution bearing against the bottom of a movable dished spring plate 28. This plate 28 is apertured at 30 to receive the upper threaded end of a rod 32. The movable plate 28 is provided with diametrically opposed lugs 34 which extend into diametrically opposite slots 36 in casing 10. The rod 32 is fixed with respect to the spring plate 28 by a nut 37 and has its lower threaded end secured to one end of an adjusting turnbuckle 38 the other end of which receives another suspension rod 40. The lower end of this latter rod is adapted to be secured to a pipe (not shown).

Block elements 44 of T-shaped cross-section are each placed with the leg 46 of the T in the slots 36. These legs 46 are provided with corresponding notches 48 which receive the lugs 34 with only enough clearance for easy insertion. Notches 50 on the outer surfaces of the blocks receive a length of wire or string 49 which is wrapped around the casing and temporarily maintains the blocks in their operating position.

The position of the movable plate 28, which controls the position of the top of the spring 26, is shown in a position which compresses the spring until it exerts a force equal to the load which is to be supported. This position is that which the plate 28 assumes when the piping system is cold, that is, when the hanger is being installed. The plate 28 is free, when the block elements 44 are removed, to move away from this installed position as the supported pipe moves to its hot, operating position.

Each variable support spring hanger like the one illustrated in Fig. 1 is adapted to support a range of pipe loads. Dependent upon a particular load the plate 28 will have various installed positions relative to the slots 36. Thus in one piping system installation the installed position of plate 28 might place the lugs 34 nearer the top of the slots 36, while in another piping system it might be nearer the bottom of the slots 36.

As explained previously, it is necessary that the plate 28 remain immovable during installation and testing and that it should remain at its installed position. The calculation of this position for an installation may be readily made and it only remains to prepare a block 44 having its notch 48 in a position corresponding to the plate position.

Fig. 3 shows that by cutting the block 44 having a length of 2S at the places designated by the dashed lines a required block of length S (the length of the slots 36) may be formed with the notch 48 in the correct position. For a different installed plate position the dashed lines illustrating the cuts would vary either upwardly or downwardly from that indicated at Fig. 3 with the limitation that the distance between them would always be equal to the distance S. Thus by fabricating the blocks 44 of a length approximately equal to twice the length of the slots 36 and by locating the notch 48 at approximately the center of the block, the blocks may be made all the same at low cost and merely cut off for every possible load which the hanger can support.

After the blocks have been cut to appropriate position the notches 48 for a given hanger the T's 46 are placed into the slots 36 so that the lugs 34 are received within the notches 48. A string or wire 49 may conveniently embrace the blocks 44 and may be positioned in notches 50 to prevent slippage. This is done before the hangers are shipped to the customer. The installation and testing procedure is then followed after which the blocks are removed to permit normal hanger operation.

The second embodiment of the invention illustrated in Fig. 4 is similar to Fig. 1 and includes a pair of block elements 44' having the same T-shaped cross-section as that of Fig. 3. These blocks would be initially of a length S which is the same as the length of the slots 36. For a given calculated installed position of the plate 28, there is a corresponding distance between the lower surfaces of the lugs 34 and the bottom of the slots 36. The blocks 44' are cut as indicated by the dashed line in Fig. 5 to this length. They are then inserted in the slots 36 with their ribs 46' extending into the casing and may also be secured by string or wire 49 embracing them. The reader will note that the block of this embodiment is useful while conducting the previously described hydrostatic test for the piping system. In conjunction with this latter embodiment a bar 52 of appropriate width, is inserted through both slots above the plate 28 to achieve the presetting.

With respect to the second embodiment it will be seen that separate T-shaped blocks like the blocks 44' may also be used in the slots above the movable plate 28 instead of the bar 52. In this connection the blocks 44' may be made initially for convenience, as long as the length of the slot less the thickness of the lugs 34. Then when the installed position of the movable plate has been established these blocks need only be cut at the appropriate place and the blocks 44' for both above and below the lugs will result.

I claim:

1. A spring hanger for supporting a load subject to movement within a limited range due to thermal expansion and contraction, said hanger comprising an elongated casing having plates secured at its ends, a movable plate within the casing, a hanger rod engaging said movable plate and extending parallel to the longitudinal axis of the casing and through one of said end plates for connection with the load to be supported, a compression spring confined within said casing between one end plate thereof and the movable plate, a plurality of slots in the casing each extending parallel to said longitudinal axis and having one end adjacent said spring, lugs extending radially outwardly from the edge of said movable plate, each lug lying within and slidable along one of the slots, a removable block for each of said slots located at least partially therein and between the lug and said one end of said slot, whereby movement of the movable plate in a direction toward said slot end is prevented.

2. A spring hanger for supporting a load subject to movement within a limited range due to thermal expansion and contraction, said hanger comprising an elongated casing having plates secured at its ends, a movable plate within the casing, a hanger rod engaging said movable plate and extending parallel to the longitudinal axis of the casing and through one of said end plates for connection with the load to be supported, a helical compression spring confined within said casing between one end plate thereof and the movable plate, opposed slots in the casing extending parallel to said axis, opposed lugs extending radially outwardly from the edge of said movable plate, each lug lying within and slidable along one of said slots, a removable block extending at least partially into each of said slots, each said block having a length equal to that of the slot, and each said block having a notch therein which receives one of the said lugs, whereby the movable plate is constrained against motion.

3. A variable support spring hanger for supporting the weight of a piping system section within a limited range of vertical movement of the section due to thermal expansion and contraction of the system, said hanger comprising an elongated cylindrical casing having plates secured at its ends, a movable plate within the casing, a hanger rod engaging said movable plate and extending parallel to the longitudinal axis of said casing and through one of said end plates for connection with the section to be supported, a helical compression spring confined within said casing around said rod and between the end plate through which said rod extends and the movable plate, a pair of diametrically opposed slots in the casing parallel to said axis and coextensive with a predetermined range of movement of said movable plate, a pair of lugs on said movable plate extending from the edge thereof radially outwardly with respect to said axis, each lug lying within and slidable along one of said slots, a pair of removable blocks of T-shaped cross-section, the leg portion of each said block having a depth substantially equal to the thickness of the wall of the casing and having a length substantially equal to the length of each slot, said leg portion also having a notch therein at a position therealong corresponding to one position of the movable plate within its range of movement, said leg portion of each said block being inserted in one of said slots with the lug received in the notch, and the remaining portions of each block being exterior to and overlying the casing on either side of the slot, whereby the movable plate is constrained against motion.

4. A variable support spring hanger for supporting the weight of a piping system section within a limited range of vertical movement of the section due to thermal expansion and contraction of the system, said hanger comprising a hollow elongated cylindrical casing having circular plates secured across its ends, one of said end plates having an aperture therein, a circular plate within the casing and movable parallel to the longitudinal axis thereof, a hanger rod having one end engaging said movable plate and extending along said axis and slidably through said end plate aperture for connection with said piping section, a helical compression spring confined within said casing around said rod and between the end plate having said opening and said movable plate, a pair of diametrically opposed slots through said casing parallel to said axis and coextensive with a predetermined range of movement of said movable plate, a pair of lugs on said movable plate extending from the edge thereof radially outwardly with respect to said axis, each lug lying within and slidable along one of said slots, a pair of removable blocks of T-shaped cross-section, the leg portion of each said block having a depth substantially equal to the distance from the outside surface of the casing to the spring and having a length substantially equal to the distance from the lug to the end of the slot nearest the apertured end plate for one position of the movable plate, said leg portion of each said block being inserted in one of said slots between said lug and said slot end, other portions of each block being exterior to and overlying the casing on either side of said slot, and a bar extending through both slots on the side of the movable plate remote from the spring, said bar engaging both said movable plate and the ends of the slots farthest from the apertured end plate, whereby the movable plate is constrained against motion.

References Cited in the file of this patent
UNITED STATES PATENTS 2,713,982    Sherbrooke _____ July 26, 1955

OTHER REFERENCES

"Bergen Pipe Hangers," Bergen Pipe Support Corp., New York, N. Y., catalog 551 page 16. (Copy in Div. 52.)